(No Model.)
P. KERN.
DEVICE FOR PRESERVING MOLDED ICE CREAM. &c.
No. 244,809. Patented July 26, 1881.
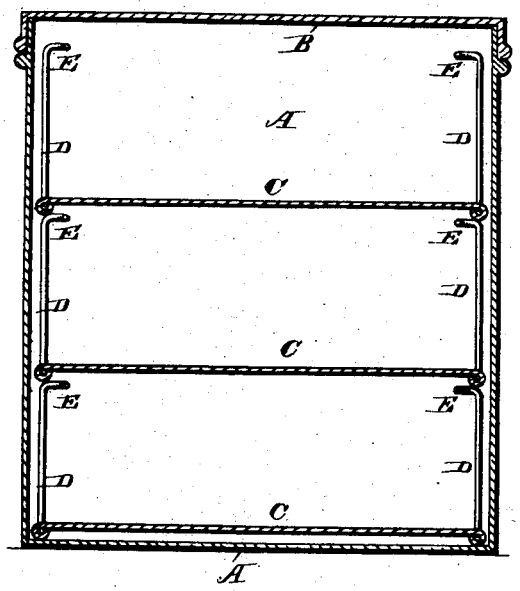
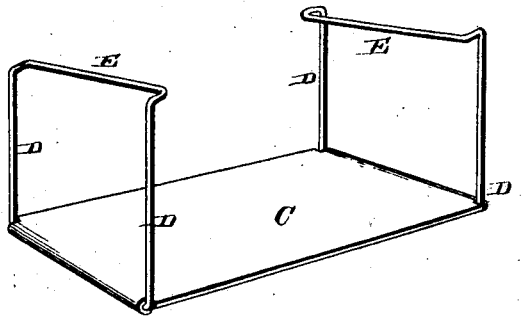
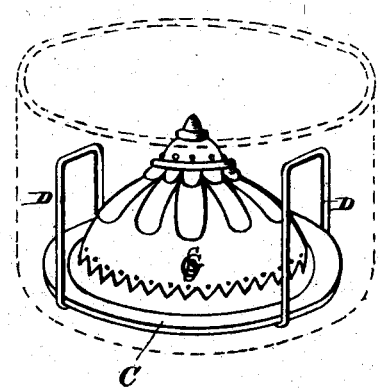
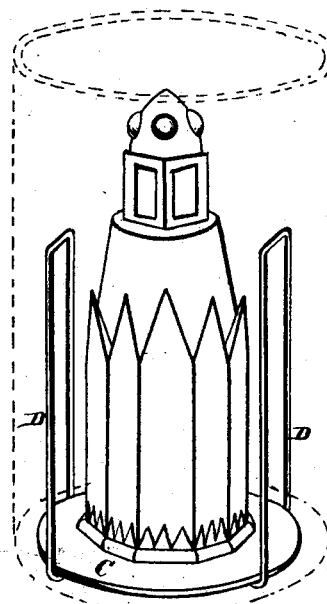
WITNESSES
Herman Moran.
F. L. Nottingham
INVENTOR
Peter Kern,
By H. A. Seymour.
ATTORNEY

UNITED STATES PATENT OFFICE.

PETER KERN, OF KNOXVILLE, TENNESSEE.

DEVICE FOR PRESERVING MOLDED ICE-CREAM, &c.

SPECIFICATION forming part of Letters Patent No. 244,809, dated July 26, 1881.

Application filed June 18, 1881. (No model.)

*To all whom it may concern:*

Be it known that I, PETER KERN, of Knoxville, in the county of Knox and State of Tennessee, have invented certain new and useful Improvements in Devices for Preserving Molded Ice-Creams, &c.; and I do hereby declare the following to be a full, clear, and exact description of the invention, such as will enable others skilled in the art to which it pertains to make and use it, reference being had to the accompanying drawings, which form part of this specification.

My invention relates to devices for preserving molded ice-creams, water-ices, and all other similar frozen confections, the object being to provide an article of the character indicated which shall admirably fulfill the the requirements of its use in combining cheapness and lightness with durability and convenience of transportation.

With these objects in view, my invention consists in certain details of construction and combinations of parts, as will be hereinafter described, and pointed out in the claims.

In the accompanying drawings, Figure 1 is a view, in vertical section, of a device constructed in accordance with my invention. Fig. 2 is a view, in perspective, of a removable tray thereof, and Figs. 3 and 4 represent modified forms of my invention.

A represents a box, made of tin or other suitable material, and provided with a close-fitting cover, B. Care should be taken to have the box perfectly water-tight, so that it may admit none of the freezing-mixture in which it is packed to the cream. The box is adapted to receive a series of trays, C, each provided with pivotal handles D, having inwardly-curved upper edges, E, to support the tray next above, and to enable them to be readily grasped in removing the trays from the box in which they are inclosed.

It is designed to transfer the molded cream from the molds, after it has become sufficiently solid in them, to the said trays, and to introduce them into the box A, the interior of which is kept at a low temperature by the freezing-mixture which surrounds it, the box being packed with ice and salt in any suitable receptacle. At the same time the strata of air interposed between the cream and the sides of the box prevent the molded cream from becoming too hard, which results if it is left in the molds for several hours.

Molds for molding cream are oftentimes very expensive and few confectioners can keep a large number in stock, and according to the old method of removing the cream from the molds just before serving it the confectioner could only produce as many molded creams as he had molds. Here my invention works a great saving, as by means of its use, whereby molded cream may be preserved after its removal from the molds, the latter may be used again and again in duplicating the same molded device. Aside from this advantage of lessening the number of molds needful, the invention will also be a great convenience to the confectioner in instance of supplying entertainments, &c., with molded creams, for instead of carrying the cream in molds packed in ice, and sending a person skilled in removing the cream from the molds, as was formerly necessary, it may be removed from them and placed on the trays, and in this condition be transported to the place of entertainment, thus avoiding the delay attending its preparation for serving, requiring no skilled labor, and being a much more convenient and neat way.

Heretofore it has been impossible to retail molded cream, because if allowed to remain in the mold long it becomes too hard, and if removed therefrom it soon perishes. However, by my invention the retailing of cream is rendered quite possible, for as soon as the cream has become solid in the mold it may be safely transferred to the trays, when it may be kept unaltered sufficiently long for all practical purposes, and if the whole of a mold of cream is not sold at one time it is an easy matter to return the remainder to the box.

The trays shown in Figs. 1 and 2 of the drawings will be sufficient in size to receive all ordinary molded creams, but are inadequate in size for very large pieces, and for them boxes and trays like those shown in Figs. 3 and 4 must be resorted to.

I would have it understood that I do not limit myself to the exact construction and combinations of parts shown and described, but hold myself at liberty to make such changes and alterations as fairly fall within the spirit and scope of my invention.

Having fully described my invention, what I claim as new, and desire to secure by Letters Patent, is—

1. In a portable case for preserving molded cream and ices, the combination, with a box, of a series of trays located therein, one above the other, said trays being provided at each end with pivotal handles having inwardly-curved upper extremities to form a support for the next tray above, substantially as set forth.

2. In a case for preserving molded creams and ices, the combination, with a tray, of handles pivotally secured to the extreme ends thereof, thereby allowing the whole space of the tray to be utilized, said handles having their upper portions inwardly curved to form a support for the tray next above, and to enable them to be readily grasped in removing the trays from the box in which they are inclosed, substantially as set forth.

In testimony that I claim the foregoing I have hereunto set my hand this 15th day of June, 1881.

PETER KERN.

Witnesses:
C. E. LUSKEY,
S. T. LOGAN.